INVENTOR:
HANS A. FAERBER
ATTORNEYS

Jan. 21, 1969    H. A. FAERBER    3,422,970
LOADING MACHINE

Filed May 6, 1966    Sheet 7 of 9

INVENTOR:
HANS A. FAERBER
ATTORNEYS

United States Patent Office 3,422,970
Patented Jan. 21, 1969

3,422,970
LOADING MACHINE
Hans Arthur Faerber, Castle Cove, New South Wales,
Australia, assignor to Nid Pty. Limited, Alexandria,
New South Wales, Australia
Filed May 6, 1966, Ser. No. 548,132
U.S. Cl. 214—8.5                                14 Claims
Int. Cl. B65g 59/02, 25/08

ABSTRACT OF THE DISCLOSURE

This invention relates to an apparatus that unstacks a plurality of items that are arranged in a vertical stack by removing several of the items, constituting a smaller stack, from the top of the vertical stack and transporting the smaller stack to a discharge point wherein individual items are removed from the bottom of the smaller stack and placed on carrier to be transported to a point of use. Means are provided to move new vertical stacks into the apparatus as they are needed.

---

This invention relates to the loading of articles one at a time into a work station or the like.

It often happens in automatic manufacturing processes that articles supplied in a stack have to be fed one at a time into a machine and machines able to effect that function are known as loading machines.

The invention was devised primarily for application to the loading of trays into a so-called Mogul or starch moulding machine for the manufacture of confectionery and is described hereinafter primarily as applied to that purpose. It will be appreciated however, that loading machines according to the invention may be used in other instances in which stacked articles are to be worked on one at a time.

In use, starch moulding machines are fed with shallow trays one after the other. The trays are then filled with edible starch powder and mould cavities are formed in the surface of the starch which are subsequently filled with a settable liquid confectionery material. At the end of the confectionery manufacturing process the trays are stacked and returned to the loading machine for reuse.

It will be appreciated that the starch moulding of confectionery is necessarily carried out at high speed because the finished product has to be sold cheaply and moulding machines have been developed to a stage permitting very high speed operation.

However, hitherto, it has been necessary to limit the speed of operation of confectionery moulding machines to a speed at which prior known loading machines have been able to feed trays from a stack thereof.

Prior known tray loading machines have comprised intake means adapted to claim a stack of trays, and transfer means adapted to remove one tray at a time from the claimed stack and feed it into a confectionery moulding machine.

When the stack of trays is exhausted it is of course necessary to move a fresh stack into the position where the transfer means may operate on it and as it is preferable for the operation of the Mogul machine to be continuous it has been necessary for the stack to be put in position in a time interval equal to that between the feed-in of successive trays. Generally speaking, the stack may comprise anything up to 40 or 50 trays and thus it is impracticable to move the stack into position at extremely high speeds because of the likelihood of the stack toppling or becoming considerably misaligned.

Thus, in effect, prior known loading machines, and therefore Mogul machines fed by them, have been limited to a speed of operation, determined not so much by the time necessary to feed an individual tray into the Mogul machine but rather by the longer time necessary to feed a stack of trays into the loading machine.

An object of the present invention is to overcome the above-indicated disabilities of prior known loading machines.

The invention achieves that object by providing a loading machine wherein the transfer means are adapted to transfer more than one article at a time from the claimed stack into feed-out means which may accept a plurality of articles from the transfer means and then dispense them one at a time to the machine being loaded; thus the time available for the emplacement of a fresh stack of articles in the loading machine is not the time taken for the outfeed of a single article but rather the longer time taken for the outfeed of a plurality of articles.

The invention consists in a loading machine adapted to feed articles one at a time from a stack of articles characterised in that it comprises intake means able to claim a stack of articles, feed-out means able to accept a plurality of articles and to dispense them one at a time and transfer means able to transfer more than one article at a time from a claimed stack to said feed-out means.

By way of example, an embodiment of the invention is described hereinafter with reference to the accompanying drawings.

The illustrated loading machine is adapted to load trays into a confectionery moulding machine. Those trays are relatively shallow rectangular trays able to be stacked one on top of the other. The transfer means of the machine now being described are adapted to handle five trays at a time, and therefore in the drawings groups of five trays are shown in light discontinuous lines and referenced 20 so as to make clear the manner in which the trays are progressed through the machine. The tray references are followed by the letters of the alphabet A, B, C, etc., to indicate consecutive positions in the movement of the trays through the machine; and, for descriptive convenience, those positions are referred to as the A position, B position and so on hereinatfer.

The illustrated machine is adapted to handle trays supplied to it stacked upon pallets of the kind often used to support an article or articles while being transported by fork lift trucks or the like. Those pallets are also shown in the drawings in light discontinuous lines and are referenced 21 followed by letters of the alphabet corresponding to those of the tray references.

Briefly, the A position is that in which a stack of trays may be left by a fork lift truck. The B position may be termed "the claimed" position, that is to say, the position to which the A stack is transferred after it has been claimed by the machine's intake means. Position C may be regarded as the "pick-up" position, that is to say, the position from which the groups of trays may be picked-up by the transfer means. Trays 20D are a group of five trays being transferred by the transfer means to the machine's feed-out means and trays 20E are trays within said feed-out means and which will be dispensed therefrom one at a time. The manner in which the various trays are shifted from one position to another will become clear from the following description of the illustrated machine.

The machine's support structure comprises two, spaced apart, upright web plates 22 with inwardly directed, stiffening, edge flanges 23 and a transverse bulk-head 24 extending from one web plate 22 to the other. At the bottom of each web plate 22 a further web plate 25 extends from one of the web plate's flanges 23 to the other so forming an open topped box at the foot of each web plate 22.

Drive transmission devices are provided to effect the synchronised operation of the various operative components of the machine and it will be appreciated that the loading machine must operate in synchronism with the moulding machine to which the trays 20 are being fed and although synchronised operation may be ensured by a variety of ways it is most simply arranged by providing a mechanical drive connection between the loading machine and the confectionery moulding machine. Thus, according to the illustrated embodiment of the invention an input shaft 26 may extend from a gear box 27 of the loading machine to the confectionery moulding machine. The shaft 26 may be connected by gears or otherwise to the drive mechanism of the confectionery moulding machine.

The gear box 27 connects the input shaft 26 to a main drive shaft 28 extending transversely of the loading machine and being supported at its ends by suitable anti-friction bearings in bearing housings 29 mounted on the respective web plates 22.

The intake means of the example of the invention now being described comprises a reciprocating pusher frame 30 carrying components which are described in detail hereinafter adapted to shift the pallets 21 and any trays 20 resting thereon from one position to the next each time the pusher frame 30 completes one reciprocation. In the drawings the pusher frame 30 is shown as just having commenced its forward stroke.

The pusher frame 30 comprises two upright posts 31 connected together at or near their top ends by a front transverse member 32, and, associated with each post 31 upper and lower frame members 33 and 34 extending rearwardly from the top and bottom ends of the post 31 respectively. The free or rear ends of the lower frame members 34 are connected by a rear transverse member 35. The dimensions of the various components of the frame 30 and the manner, for example by welding, in which they are fixed together ensures that the frame 30 is a substantially rigid structure.

Figure 3:
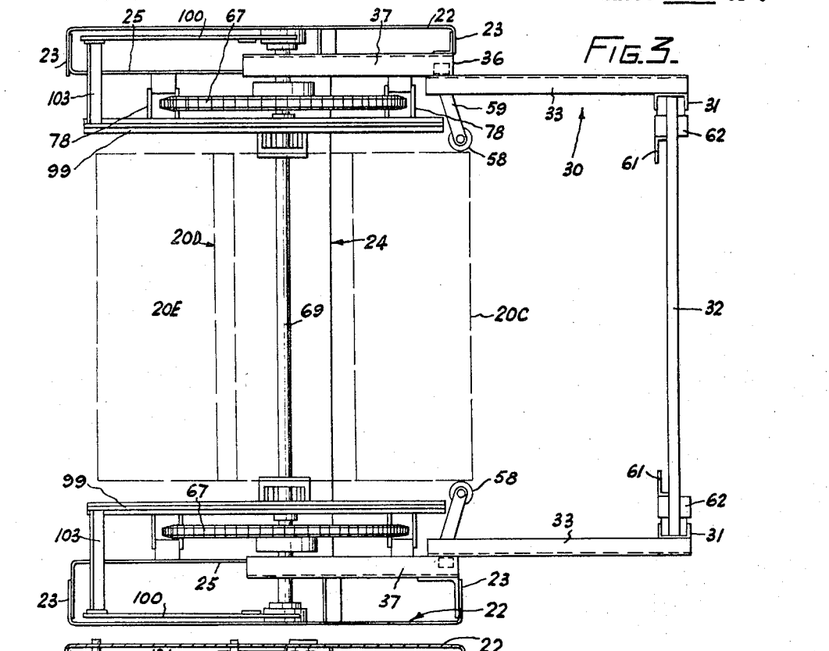
FIGURE 3 is a semidiagrammatic plan view taken on line 3—3 of FIGURE 1.
Figure 4:
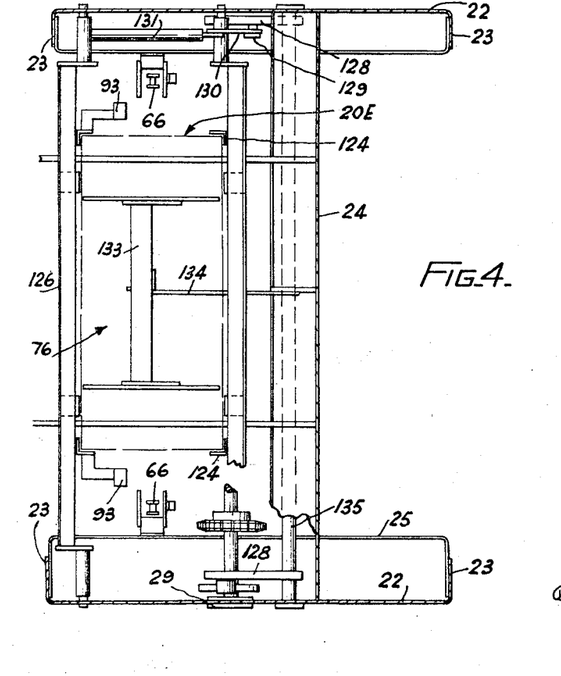
FIGURE 4 is a semidigrammatic sectional view taken on line 4—4 of FIGURE 1.

Each of the upper frame members 33 has an upper support roller 36 mounted on it adapted to run in fixed substantially horizontal channel-sectioned rails 37. Each of the frame members 34 is also supported by rollers, one near the front of the frame member 34 and one near the back end thereof; the front roller being on a bracket arm (not shown) projecting more or less horizontally from the bottom end of the post 31 with the roller disposed within a channel sectioned rail within fixed buffers 38 extending forwardly on each side of the A position and the back roller (see FIGURE 3) being mounted on a bracket arm 39 extending downwardly from a cross-tube 40.

The reciprocating motion of the pusher frame 30 is effected by means of two connecting rods 41 extending respectively from the lower frame members 34 to anchorages on pusher frame drive chains 42 riding upon sprockets 43 and 44 respectively mounted on stub axles projecting from the respective web plates 25.

Figure 9:
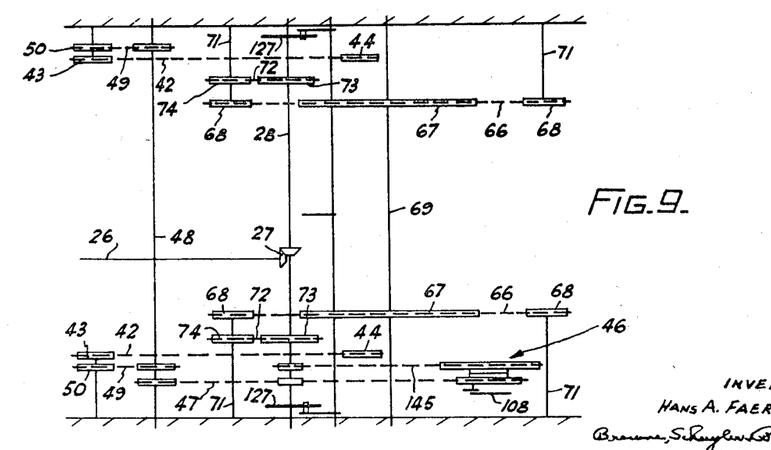
FIGURE 9 is a diagrammatic plan view illustrating the drive transmission and synchronising means of the machine of FIGURE 1.
Figure 10:
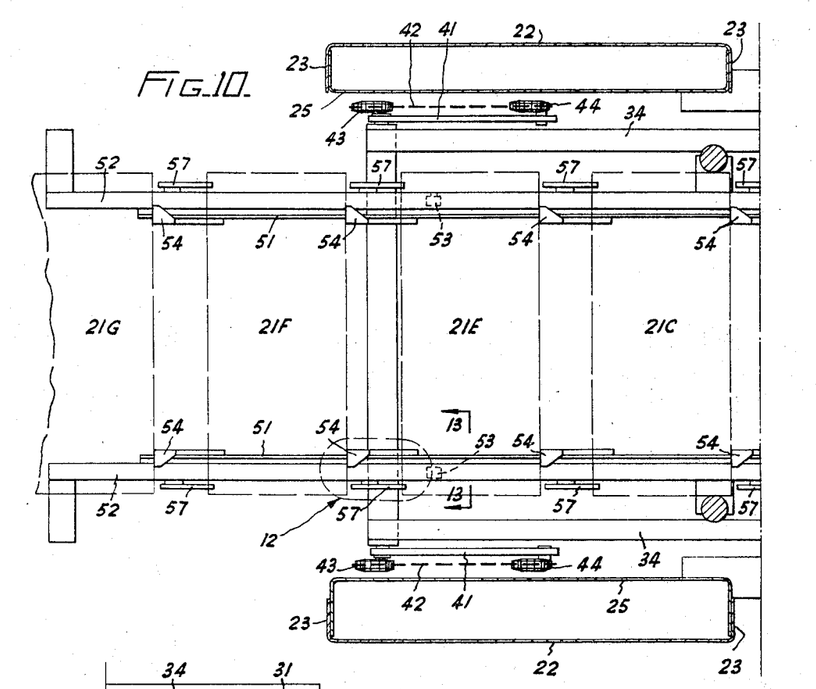
FIGURE 10 is a sectional plan view taken on line 10—10 of FIGURE 1.

As may best be seen from FIGURE 9 the drive to the pusher frame drive chains 42 is transmitted from the main drive shaft 28 by means of a first transmission chain 145 connecting the shaft 28 to the continuously rotating or driving element of a clutch 46, a second transmission chain 47 connecting the driven or intermittently rotating element of the clutch 46 to a cross-shaft 48 and a third transmission chain 49 connecting the shaft 48 to sprockets 50 fixed respectively to the sprockets 43.

The various transmission chains mentioned above ride upon suitable sprockets but it is thought that reference to the drawings will make the arrangement clear without further description thereof. It will be appreciated also that chain transmissions may be replaced by other suitable transmission means.

The clutch 46 will be described in detail hereinafter but it should be mentioned at this stage that it is essentially a single revolution clutch that is to say a clutch which, unless acted upon by external triggering or clutch operating devices, automatically disengages the driven element from the driving element upon the completion of a single revolution following an intial engagement of the clutch. In the illustrated embodiment of the invention the various sprocket diameters in the drive transmission devices are such that two revolutions of the driven element of the clutch 46 is needed to cause a complete revolution of the chain 42 and the clutch triggering mechanism includes devices to prevent the clutch 46 disengaging at the end of its first revolution so that the clutch completes two revolutions before disengaging. However, the general principle of operation is that of a self disengaging clutch such that each engagement causes a single complete reciprocation of the frame 30 at the end of which frame 30 comes to rest until such time as the clutch is reengaged by outside means.

Two, angle-sectioned, pallet transfer bars 51 extend longitudinally of the machine. They are secured to the rear transverse frame member 35 so that the transfer bars 51 reciprocate longitudinally at one with the pusher frame 30. The transfer bars 51 run partly within channel-sectioned pallet slide rails 52 secured to the floor, or to the machine structure, or to the confectionery moulding machine with which the loader is to be used. Slide rails 52 are such that the pallets 21 may slide on them from one position to the other as they travel through the machine.

The transfer bars 51 may slide on the lower flange of the slide rails 52 but for preference transfer bar supporting rollers 53 are provided to reduce the frictional restraint on the movement of the transfer bars 51.

Figure 12:
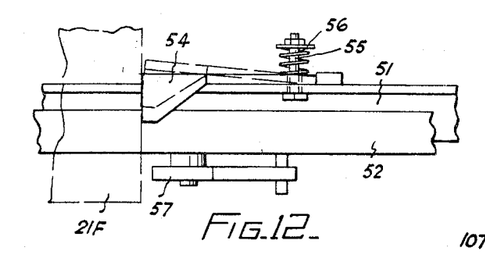
FIGURE 12 is an enlarged detail view of that portion of FIGURE 10 within the broken line enclosure 12 appearing therein.
Figure 13:
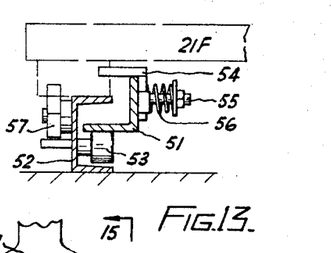
FIGURE 13 is a sectional view taken on line 13—13 of FIGURE 10 and drawn to a larger scale.

Resiliently mounted pallet pusher pawls 54 are provided at intervals on the transfer bars 51. As can best be seen in FIGURES 12 and 13 each pawl 54 may be resiliently mounted as aforesaid by means of a bolt 55 extending through a loosely fitting hole in the pawl 54 and a compression spring 56 sleeved on the bolt 55. The arrangement is such that on a forward or inward movement of the transfer bars 51 the pawls 54 are adapted to engage the pallets 21 so that the pallets move forwardly with the transfer bars 51. However, on the return stroke of the transfer bars 51 the pawls 54 swing aside so as to ride past the pallets 21. The successive positions of the pallets 51 are defined by means of gravity operated nonreturn pawls 57 over which the pallets 21 may ride during the forward movement but which prevent the pallets 21 from returning with the transfer bars 51 on their return stroke.

Thus, a stack of trays 20A on a pallet 21A may be deposited by means of a fork-lift truck or the like upon the front end portion of the slide rails 52. The next occurring reciprocation of the pusher frame 30 will then transfer the stack of trays 20A to the B position.

Likewise, each reciprocation of the pusher frame 30 carries a stack of trays 20B into the C position. During such movement the stack of trays is straightened due to their passage between a pair of upright stack straightening rolls 58 rotatably mounted between upper roll brackets 59 projecting from the machine's supporting structure and lower roll brackets 60 projecting from the pallet slide rails 52.

The stack of trays is pushed between the rolls 58 by means of pusher elements 61. Each of the pusher elements 61 is an angle-sectioned bar pivoted at its top and bottom by lugs 62 projecting from the upright posts 31. Suitably positioned stops, limit the extent to which the pusher elements 61 may rotate about their upright pivotal axes so that during each forward stroke of the pusher frame 30 one flange of each pusher element 61 lies flatly against the upright edge margins of the back surface of the stack of trays 20 being shifted from the B to the C position.

Figure 11:
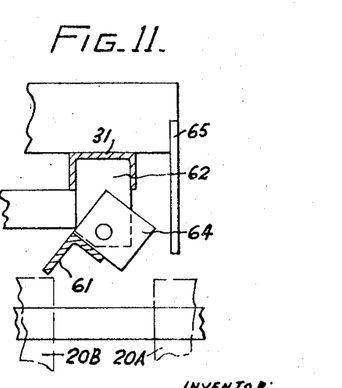
FIGURE 11 is an enlarged detail of that portion of FIGURE 10 within the broken line enclosure marked 11 appearing therein.

Towards the end of the forward movement of the pusher frame 30 projections extending downwardly from the bottom of the pusher elements 61 ride over resiliently mounted ratchet pawls 63 on the slide rails 52 and disposed between the B and C positions. On the return stroke of the pusher frame 30 the projections on the pusher element 61 strike the pawls 63 and as a result the elements 61 are rotated about their pivotal axes into the position shown in FIGURE 11, to ensure that the pusher elements 61 do not foul the trays 20 in the B position on their return stroke. Towards the end of the return stroke pusher element striker plates 64 contact fixed abutments 65 on the buffers 38 which returns the pusher elements to their former position for subsequent engagement with the trays 20B.

When a stack of trays reach the C position it is therefore correctly aligned and placed for the trays in the stack to be transferred to the feed-out means by the transfer means.

The transfer means of the illustrated embodiment of the invention comprise two, endless transfer chains 66, each riding about a large diameter head sprocket 67 and pairs of smaller foot sprockets 68.

The head sprockets 67 are fixed to a head sprocket shaft 69 which is freely rotatable in antifriction bearings 70 within bearing housings 22.

The foot sprockets 68 are mounted upon stub-axles 71 and one of the foot sprockets 68 of each of the chains 66 is drive connected to the drive shaft 28 by means of fourth transmission chains 72 riding about sprockets 73 fixed on shaft 28 and sprockets 74 respectively fixedly associated with the driven foot sprockets 68. It will be seen that each of the transfer chains is disposed with its front upright flight within the transverse centre plane of the stack of trays 20C and its back upright flight within the centre plane of the stack 20E.

Each transfer chain 66 carries at least one carrier 75 and the carrier 75 of one transfer chain 66 is in horizontal alignment with the carrier 75 of the other.

So as not to complicate the drawings, only two carriers 75 are shown therein but in practice it is preferred for there to be two carriers on each transfer chain with equal spacing therebetween. Each pair of carriers 75, that is to say, a carrier on one chain and its aligned partner on the other, are adapted to pick up the top five trays of a stack in the C position and deposit those five trays on the machine's feed-out means 76 and this process continues automatically for so long as there are trays in the C position.

Figure 17:
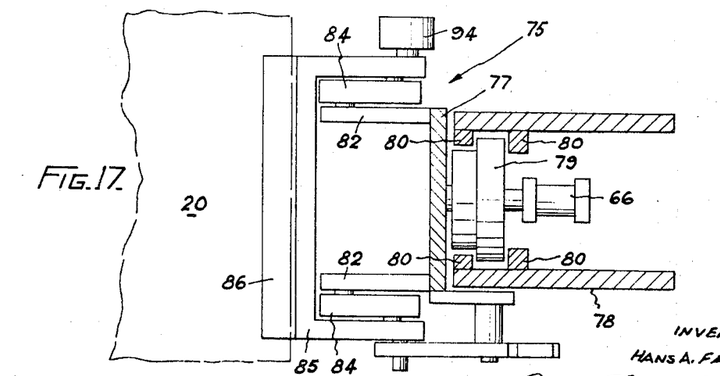
FIGURE 17 is a sectional plan view taken on line 17—17 of FIGURE 16.

Each carrier 75 comprises a back plate 77 pivotally attached to an anchorage link in its associated transfer chain 66. Throughout most of the straight portions of its travel path each chain 66 runs in substantial channel-sectioned chain guides 78 and, as can best be seen in FIGURE 17, the pin whereby each carrier 75 is connected to the transfer chain carries a flanged training roller 79 which runs between auxiliary guide ribs 80 at the mouth of the channel-sectioned chain guide 78. Furthermore, an auxiliary training roller 81 on a pin projecting from the back plate 77 runs loosely between the outermost pair of the auxiliary guide ribs 80. Thus, it will be apparent that during its upward and downward movement each carrier 75 is constrained to travel without deviating from a substantially straight path and does so without twisting or tilting.

The back plate 77 of each carrier has upright pairs of mounting flanges 82 and 83 projecting from it.

Figure 16:
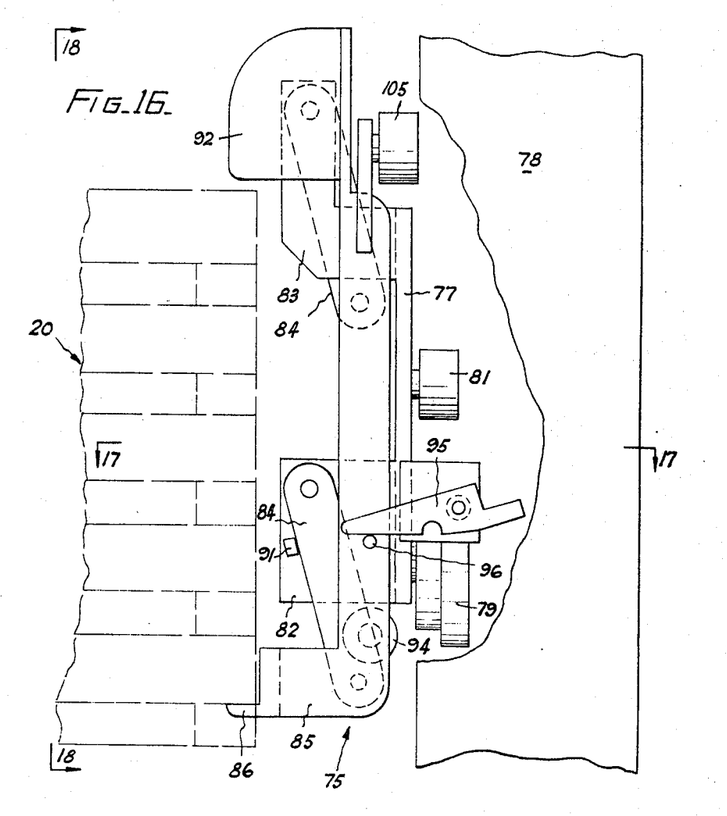
FIGURE 16 is a front elevation of a carrier, being a component of the transfer means of the machine of FIGURE 1, showing the carrier as in use carrying a plurality of trays.

Four, parallel suspension links 84 are pivoted to said mounting flanges and to the upright arms of a U-shaped hook-piece 85 having a tray lifting flange 86 projecting from it. Thus under the influence of gravity the hook-piece 85 tends at all times to adopt the position shown in FIGURE 16—referred to as the "carrying position" herein—in which the hook flanges 86 of a pair of carriers are adapted to support a tray extending from one carrier to the other. That carrying position may be determined by means of a stop 91 for one of the links 84.

The carriers are provided with hook-piece probes adapted to contact and slide against a stack of trays in the C position and thereby hold the flange 86 clear of the stack. Each such probe may comprise a smoothly formed sheet metal nosing 92 which is adapted to slide upon the end faces of trays in a stack in the C position, and thereby to push the hook-piece away from the stack of trays so that the flange 86 is clear of the trays. Thus, the carriers 75 may travel upwardly beside a stack of trays in the C position until such time as the nosings 92 rise above the top tray in the stack. At that time the weight of the hook-piece 82 causes it to swing on the links 84 into the carrying position. In the illustrated example of the invention the distance between the nosing 92 and the hook flange 86 is such that the hook flange 86 swings as aforesaid and engages under the edge of the fifth tray from the top of the stack so that five trays are then carried upwardly from the stack. The two carriers, and the five trays supported by them, then travel over the top of the head pulley 67 and downwardly to the feed-out means 76.

The five trays are then deposited on tray supports (to be described hereinafter) constituting components of the feed-out means 76.

Figure 2:
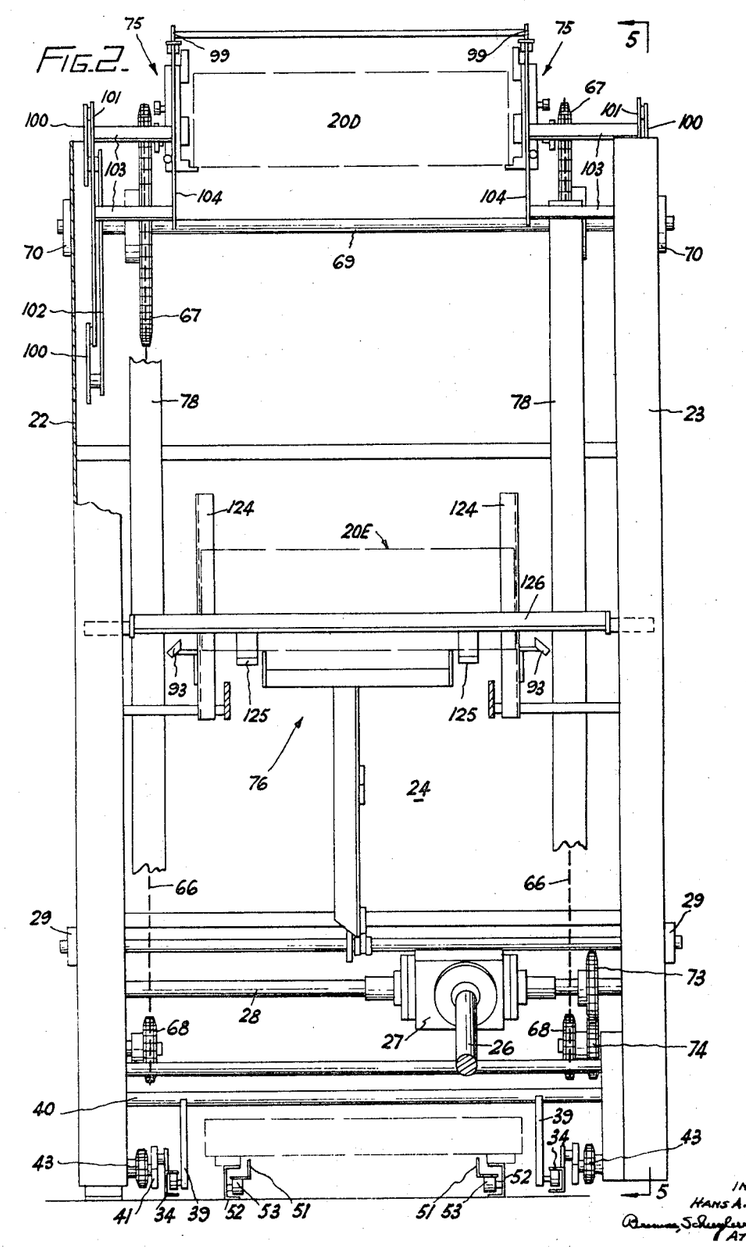
FIGURE 2 is a semidigrammatic rear elevation of the machine of FIGURE 1.
Figures 18, 19:
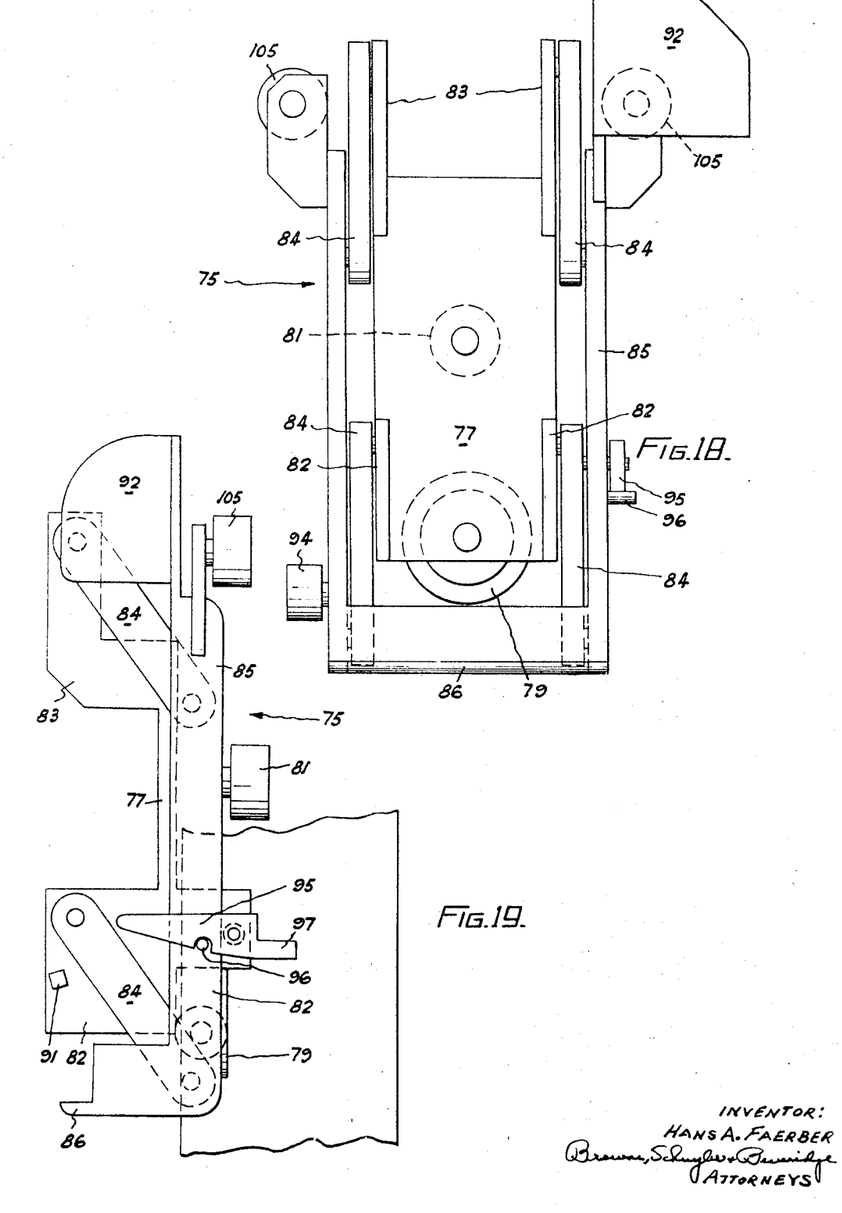
FIGURE 18 is a side elevation of the carrier of FIGURE 16 as seen when viewed in the direction of the arrows 18 appearing therein.
FIGURE 19 is a view similar to FIGURE 18 but showing the carrier in a retracted position.

The deposition of the trays is effected by means of fixed carrier latching strikers 93 (see FIGURE 2) which strike rollers 94 on pins projecting from the respective hook-pieces 82. As each roller 94 traverses an inclined face on its coacting striker 93 the hook-piece 82 is pushed into a retracted position (as shown in FIGURE 19) in which not only the flange 86 but also the nosing 92 is clear of the trays 20E which were formerly carried by the carrier. Each carrier 75 is maintained in its retracted position by means of a retainer latch 95 pivotally mounted on the back-plate 77 and which is adapted automatically to engage with a pin 96 on the hook-piece 82.

Figure 1:
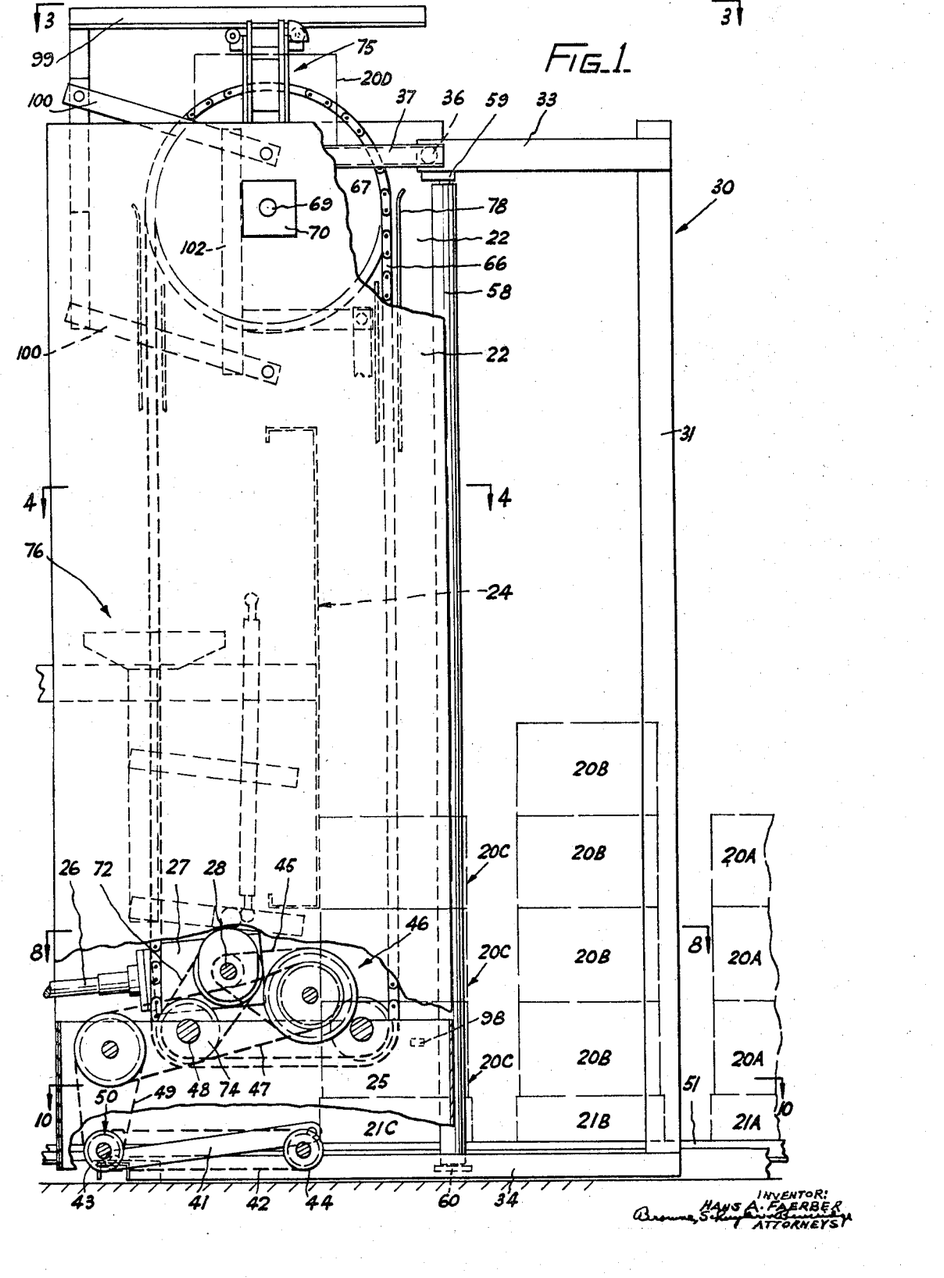
FIGURE 1 is a semidiagrammatic side elevation of a loading machine according to the invention.

Each retainer latch 95 has a tongue 97 on it and a carrier unlatching striker 98 (see FIGURE 1) is disposed adjacent to the bottom end of each of the front upright flights of the transfer chains 66. The unlatching strikers 98 are positioned such that they contact the respective tongues 97 to unlatch the hook-pieces 82 which swing downwardly and forwardly until the nosings 92 contact one of the bottom five trays 20C, so enabling the above-described cycle of operations to repeat.

When the bottom five trays 20C have been picked up and lifted to a point where they would be clear of an incoming stack of trays 20B it is necessary to effect a reciprocation of the pusher frame 30. To this end each of the carriers 75 as it moves over the head pulley 67 may contact an upwardly movable rail 99 supported by a parallel link motion comprising two swinging links 100 and upright, connecting links 101 and 102. Each of the links 101 has two cantilevers 103 extending from it supporting an upright mast 104 to the top of which the associated rail 99 is rigidly secured.

The carriers 75 are preferably provided with abutments, such as rollers 105, which contact the rails 99. As the two rollers 105 of each carrier 75 are spaced apart, their contact with the rails 99 serves not only to lift the rails 99 but also to steady the carriers 75 as they pass over the head sprockets 67.

One of the connecting links 102 has an arm 106 projecting from it and a pull rod 107 is pivoted to the arm 106 and extends downwardly therefrom to the remaining components of a clutch triggering mechanism 108. Thus, each time a pair of carriers 75 pass over the head pulleys 67 the pull rod 107 is raised. Pull rod 107 at its bottom end terminates in a slotted plate 109. The slot in the plate 109 is stepped on one side so that a landing 110 (see FIGURE 14) is formed.

Figure 14:
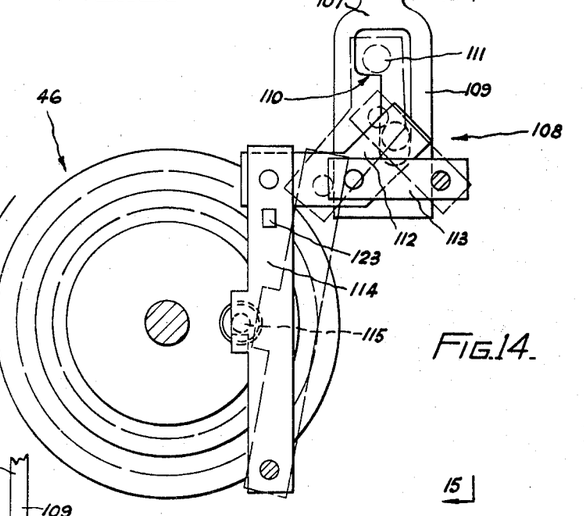
FIGURE 14 is a detail of a clutch and clutch triggering mechanism, being components of the machine of FIGURE 1.
Figure 15:
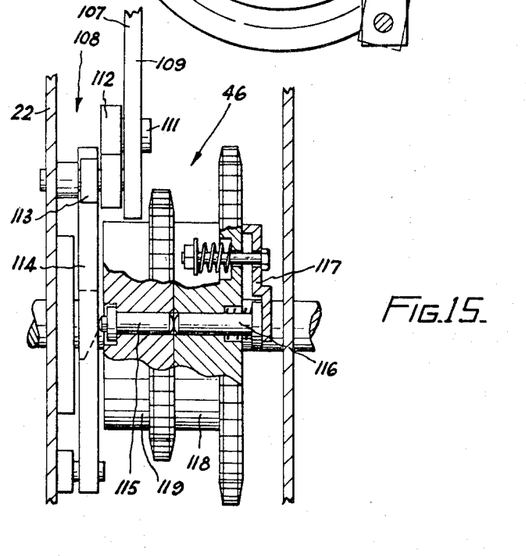
FIGURE 15 is a partly sectioned view of the clutch and triggering mechanism of FIGURE 14 taken on line 15—15 of that figure.

Thus, a pin 111 protruding from a dog leg link 112 may be lifted by the pull rod 107 if it is lodged on the landing 110 whereas if it is not lodged on that landing the pin 111 remains unaffected by the upward and downward movement of the pull rod 107. If the pin 111 is lifted as aforesaid the dog leg link 112 is lifted with it and due to the effect of a control link 113 the left hand end of the dog leg link (as seen in FIGURE 14) moves to the right and so swings a pivotally mounted clutch release lever 114 to one side so that it is clear of a clutch push rod 115.

When the clutch release lever 114 is swung clear of the clutch push rod 115 a key pin 116 may be shifted by means of a spring loaded rocker arm 117 so that it partially displaces the clutch push rod 115 when and if the push rod 115 and key pin 116 come into coaxial alignment. In that event the key pin 116 extends from the clutch driving element 118 into the driven element 119. That is to say, when the clutch release lever 114 is swung aside the driven element 119 becomes locked to the driving element 118 as soon as the key pin 116 happens to come into axial alignment with the clutch push rod 115. There is only one push rod 115 but for preference there are 2, 3 or more key pins 116, each with its associated rocker arm 117, at equally spaced intervals around the periphery of the driving element 118.

Figures 5, 6, 7:
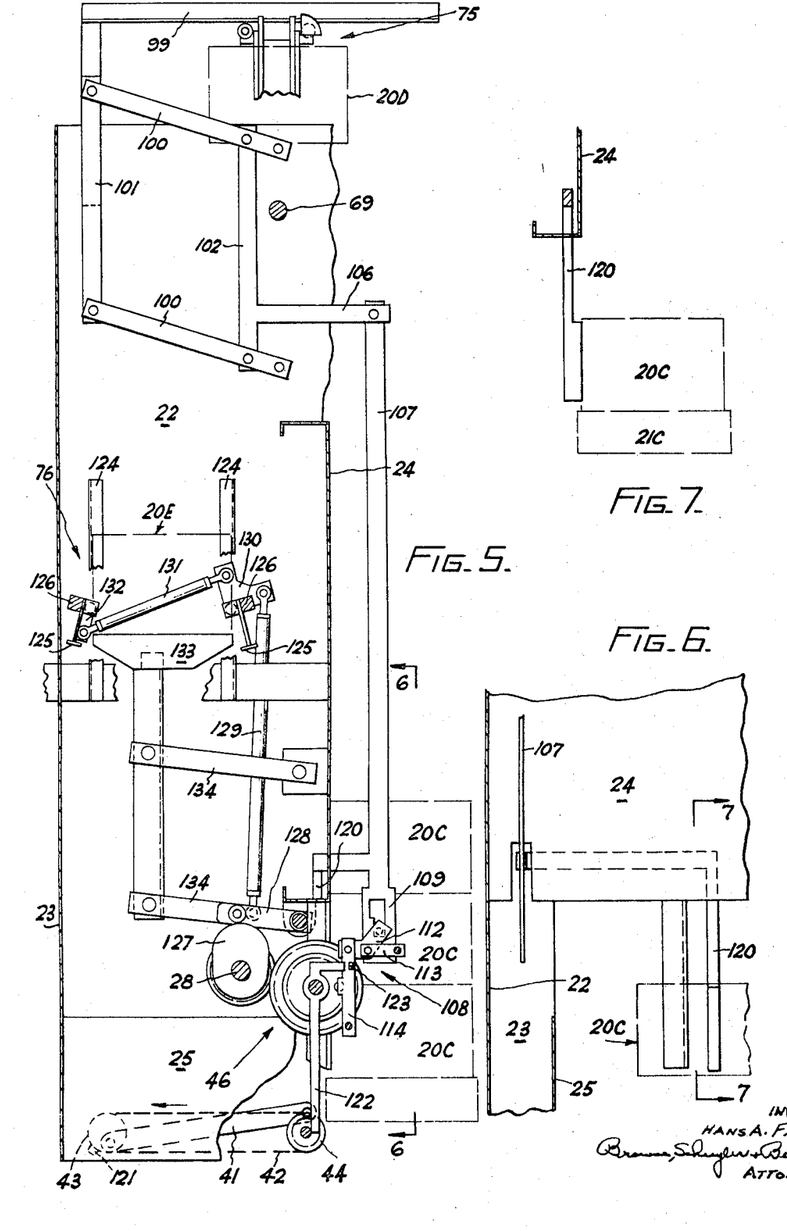
FIGURE 5 is a semidigrammatic side elevation of a rear portion of the machine of FIGURE 1 taken on line 5—5 of FIGURE 2.
FIGURE 6 is a semidiagrammatic detail view taken on line 6—6 of FIGURE 5.
FIGURE 7 is a detail view taken on line 7—7 of FIGURE 6.
Figure 8:
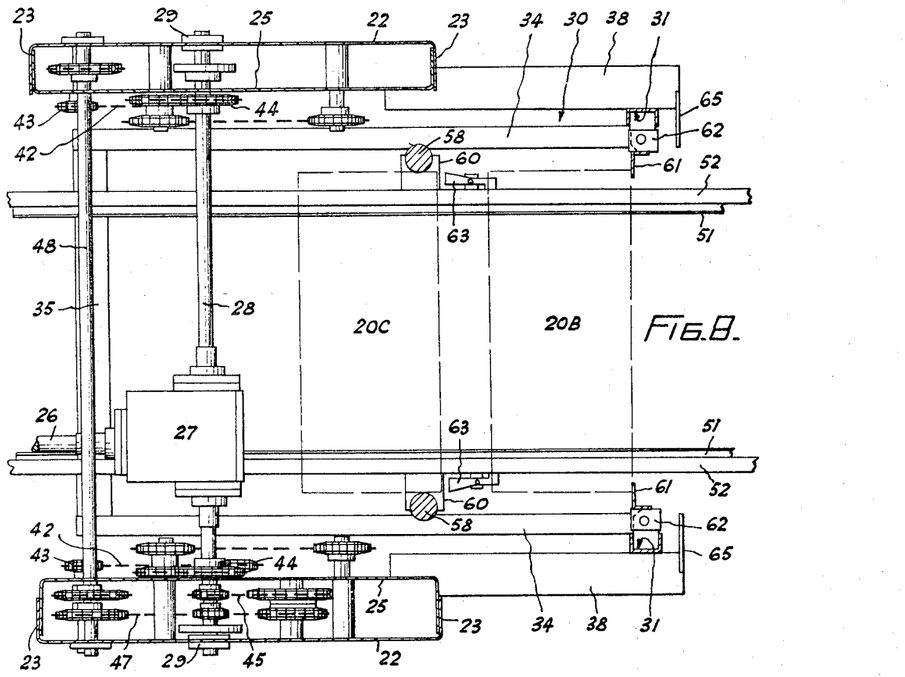
FIGURE 8 is a semidiagrammatic sectional view taken on line 8—8 of FIGURE 1.

As was stated earlier the clutch triggering mechanism is only actuated by the pull rod 107 when the pin 111 becomes lodged on the landing 110. The distribution of the weight of the various components fixed to the pull rod 107 is such that the pull rod 107 tends to swing to the right (as seen in FIGURE 5) so as to bring the pin 111 onto the landing 110 but the pull rod 107 is prevented from so swinging by means of a pull rod probe 120 extending from the pull rod 107 into contact with the bottom few members of the stack of trays 20 in the C position. Therefore, for so long as the bottom five trays remain in the C position the pull rod 107 rises and falls without affecting the clutch 46 but as soon as the last five trays are lifted above the pull rod probe 120 the lost motion is taken up and the clutch triggering may be operated and the clutch engaged.

As soon as the clutch is engaged power is transmitted to the connecting rods 41 so that a forward movement of the pusher frame 30 is commenced. As the clutch 46 approaches the end of a full revolution and the pusher frame is therefore approaching the end of its forward stroke a clutch release striker 121 contacts one end of a bell crank lever 122 which then rocks so that its other end pushes upon an abutment 123 projecting from the clutch release lever 114 so as to swing the lever aside clear of the push rod 115 for sufficient time to allow the key pin 116 to travel out of reach of the lever 114. Thus, the clutch commences a second revolution which brings about the return stroke of the pusher frame 30. At the end of that second revolution the pin 115 rides against a tapered face on the release lever 114 so as to push the key pin 116 back into the driving element 118 thereby disengaging the driven element 119 therefrom. Such disengagement only occurs if the reciprocation of the pusher frame 30 brought a fresh stack of trays into the C position, if not a further reciprocation is commenced.

Once a pair of carriers 75 has deposited a stack of trays on the feed-out means those means discharge the five trays one at a time. The feed-out means comprise a tray magazine comprising four upright angle-sectioned tray guides 124 which ensure that the five trays 20E do not become displaced horizontally while waiting to be dispensed. The feed-out means 76 also includes tray supports at the foot of the magazine comprising two pairs of retractable tray supporting lugs 125 fixedly mounted on bracket arms extending downwardly from two rock shafts 126 extending transversely of the machine and disposed one on each side of the trays 20E.

Two feed-out means operating cams 127 are mounted on the drive shaft 28 and swinging lever type cam followers 128 ride thereon. One of the cam followers 128 is connected by a push rod 129 to one arm of a bell crank 130 fixedly secured to one end of one of the rock shafts 126. The other arm of the bell crank 130 is linked by a further push rod 131 to an arm of a corresponding bell crank 132. Thus, each time the followers 128 are lifted by the cams 127 the rock shafts 126 rotate in concert to swing the tray supporting lugs 125 clear of the stack of trays 20E thus allowing the trays 20E to move downwardly within the guides 125. However, at the same time, an upwardly movable, table 133 supported by a table parallel linkage 134 is caused to rise (due to the enforced rotation of the parallel linkage caused by the rotation of a table operating shaft 135 from which the followers 128 extend) and take the weight of the trays 20E. The operation of the table 133 and the supporting lugs 125 are synchronised so that the lugs 125 move into position to grip the second bottom tray of the stack 20E as the table 133 is lowered so that the bottom tray moves away from the stack in the magazine with the table 33 and the remaining trays stay in the feed-out magazine.

The tray lowered with the table 133 may be lowered onto any suitable conveyor protruding into the loading machine for discharge into a starch moulding machine.

It will be appreciated that the above-described embodiment of the invention has been described purely by way of example and that the invention extends to all designs of loader wherein more than one tray at a time is removed from the original stack and are then transferred to separate feed-out devices for dispensing one by one.

According to other embodiments of the invention the pallet transfer bars 51 and their associated slide rails 52 are greatly extended for the transfer of pallets to a remote point, for example, the pallet feed-in equipment of a tray stacking machine adapted to receive trays one at a time from the output end of a starch moulding machine. Then again the pallet transfer devices may be adapted for discharge directly onto a suitable pallet conveyor extending, for example, under a starch moulding machine to the output tray stacker thereof.

The illustrated embodiment of the invention provides for purely mechanical devices to effect the concerted operation of the various operative components of the machine but it will be appreciated that the electrical control gear or pneumatic control gear of conventional kind may be used to initiate and effect the movements of the various components in the necessary sequence. For example, the single revolution clutch may be solenoid operated by means of suitably positioned limit switches adapted to sense the removal of the last articles from the C position. Alternatively, the clutch may be pneumatically operated by way of pilot valves able to sense that condition.

The transfer means may take any suitable form, for example, the endless transfer chain and their pulleys could be replaced by a pair of large "Ferris" wheels with the carriers secured to their peripheries.

Finally, the feed-out means may also be electrical or pneumatically operated by operating mechanism controlled by the machine to which the articles are to be fed.

I claim:

1. An article unstacking and feeding apparatus for feeding stackable articles one at a time from a vertical stack of such articles comprising, in combination, a receiving station for receiving successive stacks each containing a plurality of such articles in vertically stacked relation, intake means for engaging and moving said successive stacks from said receiving station to a transfer station, said intake means including means providing lateral support to said stack during movement, a feed out station spaced from said transfer station, transfer means movable between said transfer station and said feed out station for simultaneously removing a predetermined number of articles as a stacked group from the top of a stack of articles at said transfer station and transferring the removed group to said feed out station, and feed out means at said feed out station for feeding individual articles one at a time from the bottom of a stacked group of articles transferred to said feed out station.

2. The apparatus defined in claim 1 wherein said intake means comprises a reciprocating pusher frame movable between said receiving station and said transfer station, stationary guide means extending between said receiving and said transfer stations, a plurality of spaced pusher pawls on said frame for engaging and moving a stack of articles during movement of said frame toward said transfer station, and a plurality of spaced nonreturn pawls on said stationary guide means for engaging and preventing movement of a stack of articles toward said station during movement of said pusher frame toward said receiving station.

3. The apparatus defined in claim 2 wherein said means providing lateral support to said stack during movement comprises a pair of posts mounted on said pusher frame in laterally spaced relation to one another for reciprocating movement therewith, said posts being positioned to pass on opposite sides of the stack of articles at said receiving station upon reciprocating movement of said pusher frame, pusher means pivotally mounted on each of said posts, and means for rotating said pusher means between a pushing position to contact a surface of a stack of articles along the height of the stack during movement of said pusher frame toward said transfer station and a retracted position passing clear of a stack of articles during movement toward said receiving station.

4. An article unstacking and feeding apparatus according to claim 1, wherein said means providing lateral support to said stack during movement comprises stacked straightening means for engaging and vertically straightening the stack as it enters the position in which it may be engaged by said transfer means.

5. A loading machine according to claim 4 wherein said stack straightening means comprise two stack straightening rolls between which the stack of articles is pushed.

6. A loading machine according to claim 5 wherein said intake means are adapted to progress pallets on which stacks of articles are delivered to the machine through the machine and to a point remote therefrom.

7. A loading machine according to claim 5 wherein said intake means are adapted to transfer pallets on which stacks of articles are delivered to the machine to a conveyor for carriage to a point remote from the machine.

8. A loading machine according to claim 7 wherein said point remote from the machine is the pallet intake devices of an article stacking machine.

9. A loading machine adapted to dispense articles one at a time from a stack of articles comprising intake means able to claim a stack of articles, feed out means able to accept a plurality of articles and to dispense the articles one at a time, transfer means able to transfer more than one article at a time from a claimed stack thereof to said feed out means, said transfer means including a pair of transfer chains riding on spaced apart pairs of coaxial pulleys disposed and driven such that each chain has an upward moving front flight and a downwardly moving back flight with the front of one chain parallel to and spaced from the front flight of the other and the back flight of said one chain being parallel to and similarly spaced from the back flight of the other and at least two carriages, one on each chain and in horizontal alignment each to each, adapted to pick up two or more articles from the top of a stack of articles disposed between the front flights and subsequently to deposit said two or more articles at said feed out means disposed between said back flights, each of said carriages including a back plate pivoted to its associated transfer cabin, a U-shaped hookplate disposed with its arms substantially upright and having a tray lifting flange projecting from it, four parallel suspension links supporting said hook piece from the back plate, latching means adapted to secure said hookpiece in the retracted position, a probe adapted to slide upon the stack of the articles to be picked up to retain said lifting flange clear thereof when the hook piece is unlatched until such time as the probe clears the topmost article in the stack, and stack straightening means for straigthening the stack as it enters the position in which it may be engaged by said transfer means.

10. A loading machine according to claim 9 wherein said hook-piece is retracted by contact with a striker element for deposition of articles in said feed-out means to an extent causing said latch means to hold the hookpiece in its retracted position, and wherein the hook-piece is unlatched by means of a release striker which contacts the latch means once the carrier is clear of the feed-out means.

11. A loading machine according to claim 10 wherein said intake means are put into operation to claim a stack of articles by means of drive transmission devices including a single revolution clutch and clutch triggering mechanism to engage said clutch in response to the transfer of the bottom articles of a stack clear of the position in which the stack may be engaged by the transfer means.

12. A loading machine according to claim 11, wherein said clutch triggering mechanism is adapted to respond to the passage of each pair of tray carrying carriers but is prevented from so responding for so long as a probe is prevented from protruding into the space occupied by the bottom portion of a stack of articles in the position in which they may be engaged by said transfer means.

13. A loading machine according to claim 12 wherein said triggering mechanism is actuated by means of a pull rod connected to an upwardly movable rail which is lifted by each carrier as it is transferring articles but wherein the connection between said pull rod and the triggering means has lost motion except when said probe protrudes as aforesaid.

14. A loading machine according to claim 1 wherein said feed-out means comprise an article magazine, retractable supporting lugs adapted to support a plurality of articles in said magazine when in their non-retracted position, and an upwardly and downwardly movable supporting table below said magazine adapted to support articles therein when in its uppermost position, the operation of said retractable support lugs and said table being synchronised to permit the successively bottom articles in the magazine to be transferred to the table for carriage away from the magazine thereby.

References Cited

UNITED STATES PATENTS

| 1,462,510 | 7/1923 | Lister | 198—225 |
| 2,108,457 | 2/1938 | Tobia | 214—8.5 X |
| 2,701,064 | 2/1955 | Byington. | |

GERALD M. FORLENZA, *Primary Examiner.*

G. F. ABRAHAM, *Assistant Examiner.*

U.S. Cl. X.R.

198—221